Oct. 4, 1966   E. R. HATTENDORF   3,276,255
SYSTEM FOR DEVELOPMENT OF COMPLEMENTED VERTICAL
SPEED IN AIRCRAFT
Filed Jan. 23, 1964

INVENTOR.
EDWIN R. HATTENDORF
BY
*Moody & Anderson*
AGENTS

United States Patent Office 3,276,255
Patented Oct. 4, 1966

3,276,255
SYSTEM FOR DEVELOPMENT OF COMPLE-MENTED VERTICAL SPEED IN AIRCRAFT
Edwin R. Hattendorf, Cedar Rapids, Iowa, assignor to Collins Radio Company, Cedar Rapids, Iowa, a corporation of Iowa
Filed Jan. 23, 1964, Ser. No. 339,703
3 Claims. (Cl. 73—179)

This invention relates generally to aircraft control and more particularly to a system for development of a signal proportional to the vertical speed of an aircraft.

Various means are employed in aircraft control by which the aircraft may be maintained in a desired flight path by means of computations developing a command signal in response to airspeed, altitude, altitude rate, pitch and vertical acceleration parameters. It is imperative in automatic flight control systems that command signals maintain the aircraft on the correct path. During critical flight modes such as in landing, the command signal must be reliable and devoid of various noise perturbations. In systems employing altitude rate as a control parameter, it is particularly important that the altitude rate signal be improved from that derived from sensing equipment. Many systems derive altitude rate from a servo which follows the altimeter static bellows. As such, the altitude rate signal may vary for slowly changing altitude because the servo does not follow smoothly, and the altitude rate output at low levels is obscured by noise. In addition, the bellows type of altimeter inherently produces output indications which lag the true condition due to the pitot tube configuration. Still further, the altitude rate signal may include aerodynamic noise originating from wind gusts and from sudden changes of barometric pressure which are misinterpreted by the altitude rate development circuitry as a sudden change in altitude.

The present invention relates to a system for improving such a vertical speed signal by a proper complementation whereby a more nearly true altitude rate signal may be derived for exacting control purposes. The invention is featured in a system to which an altitude rate signal is applied and from which a complemented vertical speed signal is taken which is complemented for the inherent lag of the input altitude rate signal and from which noise due to aerodynamics and stiction are removed.

These and other objects and features of the present invention may best be comprehended by reading the following description in conjunction with the accompanying drawings in which.

The present invention has as a primary purpose thereof the provision of a method and means by which a true altitude rate signal may be derived. Such a signal is particularly necessary during sensitive flight control functions such as flying glide slope and glide slope extension modes. A typical altitude rate signal as derived from a barometric altimeter is plagued with noise and lags to the extent that the use of such a signal for exacting aircraft control in critical flight phases is prohibitive. In general then, the present invention provides a means for operating on the altitude rate signal by means of a complementary filtering principle such that undesirable frequency components present in altitude rate signal are removed, and by which the altitude rate signal may be developed as a more nearly true indication.

Figure 1:
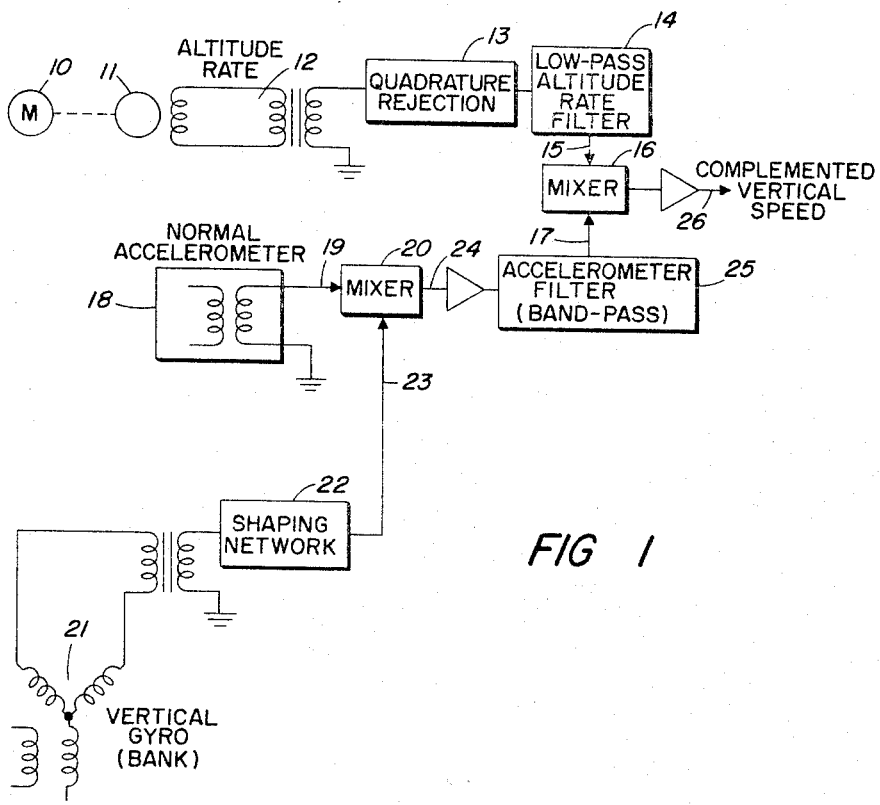
FIGURE 1 is a block diagram of a system for complementing altitude rate in accordance with the present invention.

With reference to FIGURE 1, the system comprises an altitude servo (not illustrated) which includes a servo motor 10 and a rate generator 11; the latter developing an altitude rate signal 12. The rate signal 12, in accordance with the present invention is that which is complemented so as to reduce aerodynamic noise, stiction, and lag which is inherently introduced by barometric altimeters. The altitude rate signal 12 is applied through a quadrature rejection filter 13 and a low pass filter 14 as a first input 15 to a mixer 16. Mixer 16 receives a second input 17 in the form of a filtered acceleration signal as developed from a normal accelerometer and a gyro. For this purpose, a normal accelerometer 18 develops a first input 19 to a mixer 20. A signal proportional to bank is taken from a transducer winding 21 associated with a vertical gyro and applied through a shaping network 22 as a second input 23 to mixer 20. The combined signal 24 from mixer 20 is applied through a bandpass filter 25 as the second input 17 to the output mixer 16. The output 26 from mixer 16 is the complemented vertical speed signal in accordance with the present invention.

In operation, the circuitry of FIGURE 1 performs certain complementations and filtering actions by which undesirable frequency components of the input altitude rate signal 12 are removed and certain frequency components are inserted such that the output signal 26 is a true vertical speed signal.

Referring to FIGURE 1, the altitude rate signal 12 is first applied through quadrature rejection filter 13 to remove any quadrature signal components coming from the rate generator 11. From filter 13 the signal is passed through low pass, second-order filter 14. Filter 14 rejects the high frequency noise components previously discussed. Since filter 14 also attenuates true high frequency components and introduces some lag to these components, the high frequency components are reinserted by bringing in the signal from the normal accelerometer 18. The output 19 from normal accelerometer 18 (neglecting for the moment the inclusion of the bank signal 23) is passed through accelerometer filter 25 before combining with the low-passed altitude rate signal 15. The bandpass of accelerometer filter 25 defines a frequency spectrum such that the two filtered signals 15 and 17, together give a close approximation to true aircraft altitude rate, while rejecting the undesirable noise components from the sensor.

The steady state earth's gravity component picked up by the accelerometer 18 is removed by the bandpass accelerometer filter 25. A compensation during significant banking maneuvers is introduced by the bank signal from the vertical gyro bank transducer 21 which is shaped in network 22 and combined with the accelerometer signal in mixer 20 prior to application to bandpass filter 25.

The manner in which the above discussed arrangement develops a true vertical speed signal may best be comprehended from a consideration of the transfer functions of the filters involved and the manner in which the signals are combined to arrive at the output 26. The transfer function of the second order low pass filter 14 to which the input altitude rate signal 12 is applied may be expressed in LaPlacian form as:

(1)
$$\frac{K\left(S+\frac{K}{4}\right)}{S^2+KS+\frac{K^2}{4}}$$

where K is a gain constant and S is the complex variable in the LaPlace transformation.

The transfer function of bandpass filter 25 may be expressed in LaPlacian form as:

(2)
$$\frac{S}{S^2+KS+\frac{K^2}{4}}$$

The output 24 from mixer 20 may be expressed in LaPlacian form as $S\dot{h}_a$, where $\dot{h}_a$ is the output from normal accelerometer 18.

The transfer function for the over-all complementation network may then be expressed as follows:

(3)
$$\dot{h}_c = [\dot{h}_{in}]\frac{K\left(S+\frac{K}{4}\right)}{S^2+KS+\frac{K^2}{4}} + [S\dot{h}_a]\frac{S}{S^2+KS+\frac{K^2}{2}}$$

$$= \frac{S^2+K\left(S+\frac{K}{4}\right)}{S^2+KS+\frac{K^2}{4}}\dot{h}$$

where $\dot{h}_c$ is the output complemented vertical speed 26, $\dot{h}_{in}$ is the input altitude rate signal 12, and $\dot{h}$ is the general mathematical expression for altitude rate.

The terms of expression (3) combine to give an over-all transfer function having the same numerator and denominator to arrive at:

(4)
$$\dot{h}_c = \frac{S^2+KS+\frac{K^2}{4}}{S^2+KS+\frac{K^2}{4}}\dot{h}$$

Expression 4 may therefore be written as (5) $\dot{h}_c = \dot{h}$ from which it is seen that the output 26 equals $\dot{h}$, so that the system is seen to develop an output vertical speed signal from which have been rejected the undesired frequency components of the sensors, while providing a very good approximation of true altitude rate.

Figure 2:
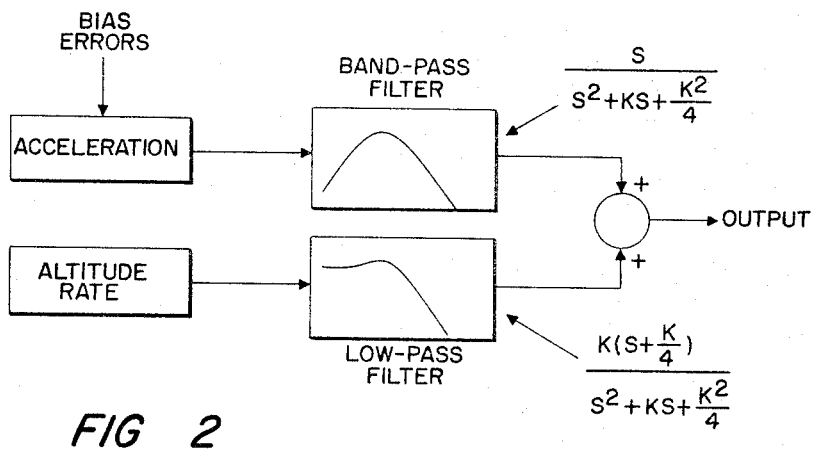
FIGURE 2 is a diagrammatic representation of the filtering characteristics in accordance with the system of FIGURE 1.

The action of the filters in the system of FIGURE 1 are represented diagrammatically in FIGURE 2 in which it is seen that the acceleration signal from accelerometer 18, including bias errors, is applied through bandpass filter 25, the characteristic of which rejects the steady state or bias errors which are normally associated with a signal from this type of sensor. The altitude rate signal 12 is applied through the low pass filter 14 and added with the output from bandpass filter 25 in mixer 17. The output is thus free of bias errors which can be fairly prevalent in the acceleration signal from accelerometer 18 due to non-perfect pitch and bank compensation and non-perfect earth's gravity vector compensation. The output signal 26 is thus a true vertical speed indicative signal which may be used for exacting aircraft control.

Although this invention has been described with reference to a particular embodiment thereof it is not to be so limited as changes might be made therein which fall within the scope of the invention as defined by the appended claims.

I claim:

1. In an aircraft control system, means for developing an altitude rate signal of improved frequency spectrum comprising a first sensor developing a signal proportional to the rate of change of altitude of said aircraft, low pass filtering means receiving said altitude signal and supplying a first input to a signal mixing means, means developing a signal proportional to aircraft vertical acceleration, bandpass filtering means receiving said vertical acceleration signal and supplying a second input to said signal mixing means, said low pass filtering means comprises a second order low pass filter having a transfer characteristic expressed in LaPlacian form as $$\frac{K\left(S+\frac{K}{4}\right)}{S^2+KS+\frac{K^2}{4}}$$

and said band pass filtering means has a transfer characteristic expressed in LaPlacian form as $$\frac{S}{S^2+KS+\frac{K^2}{4}}$$

where K is a gain constant and S the transform variable, the output from said mixing means being a signal proportional to altitude rate from which undesirable frequency components present in the signals from said first and second sensors have been removed.

2. Signal development means as defined in claim 1 wherein said means for developing a signal proportional to aircraft vertical acceleration comprises a second signal mixing means, a source of signal proportional to aircraft bank attitude, a source of signal proportional to aircraft normal acceleration said second signal mixing means receiving said normal acceleration and bank signals as inputs thereto, the output of said second signal mixing means being connected as input to said bandpass filtering means.

3. Signal development means as defined in claim 2 further including a quadrature rejection filtering means connected between the output of said altitude rate sensor and the input to said low pass filtering means.

References Cited by the Examiner

UNITED STATES PATENTS

| | | | |
|---|---|---|---|
| 2,970,471 | 2/1961 | Summerlin | 73—179 |
| 3,055,214 | 9/1962 | McLane | 73—178 |
| 3,077,557 | 2/1963 | Joline et al. | 244—77 X |
| 3,130,702 | 4/1964 | Fischer | 244—77 X |
| 3,203,652 | 10/1965 | Doniger | 244—77 |

LOUIS R. PRINCE, *Primary Examiner.*

D. McGIEHAN, *Assistant Examiner.*